(12) United States Patent
Zheng et al.

(10) Patent No.: US 11,783,065 B2
(45) Date of Patent: Oct. 10, 2023

(54) BUSINESS DATA PROTECTION FOR RUNNING TASKS IN COMPUTER SYSTEM

(71) Applicant: INTERNATIONAL BUSINESS MACHINES CORPORATION, Armonk, NY (US)

(72) Inventors: Xin Zheng, Beijing (CN); Xin Zhou, Beijing (CN); Zhen Zhang, Beijing (CN); Yan Feng, Beijing (CN); Yun Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 383 days.

(21) Appl. No.: 17/104,000

(22) Filed: Nov. 25, 2020

(65) Prior Publication Data
US 2022/0164463 A1 May 26, 2022

(51) Int. Cl.
*G06F 21/00* (2013.01)
*G06F 21/62* (2013.01)
*G06F 16/23* (2019.01)
*G06F 11/36* (2006.01)

(52) U.S. Cl.
CPC ........ *G06F 21/6218* (2013.01); *G06F 11/362* (2013.01); *G06F 16/2379* (2019.01)

(58) Field of Classification Search
CPC ............... G06F 21/6218; G06F 11/362; G06F 16/2379; G06F 11/3664
See application file for complete search history.

(56) References Cited

U.S. PATENT DOCUMENTS

| | | | |
|---|---|---|---|
| 10,223,238 B1* | 3/2019 | Nash | G06F 11/3636 |
| 10,366,240 B1 | 7/2019 | Maman et al. | |
| 2015/0169886 A1* | 6/2015 | Bhagwan | G06F 21/6254 |
| | | | 726/26 |
| 2016/0357732 A1 | 12/2016 | Hsu et al. | |
| 2017/0116607 A1 | 4/2017 | Leighton | |
| 2017/0147521 A1 | 5/2017 | Mishra et al. | |
| 2017/0213041 A1 | 7/2017 | Medvedev | |
| 2017/0228326 A1 | 8/2017 | Depeyrot et al. | |

(Continued)

OTHER PUBLICATIONS

McIlroy, et al., "Spectre is here to stay An analysis of side-channels and speculative execution", arXiv preprint, 2019, 26 pages.

*Primary Examiner* — Mahfuzur Rahman
(74) *Attorney, Agent, or Firm* — CANTOR COLBURN LLP; Jeffrey Ingalls

(57) ABSTRACT

Techniques for business data protection for running tasks in a computer system are described herein. An aspect includes receiving a request. Another aspect includes processing a task corresponding to the request. Another aspect includes receiving a debugging request from a user corresponding to the task, wherein the debugging request is received during the processing of the task. Another aspect includes, based on receiving the debugging request, determining whether the user is authorized to access business data corresponding to the task. Another aspect includes, based on determining that the user is not authorized to access the business data corresponding to the task, redacting the business data from debugging data corresponding to the debugging request. Another aspect includes providing the redacted debugging data to the user.

17 Claims, 7 Drawing Sheets

(56) References Cited

U.S. PATENT DOCUMENTS

| | | |
|---|---|---|
| 2017/0251276 A1 | 8/2017 | David |
| 2019/0065780 A1* | 2/2019 | Joisha ................. G06F 11/0778 |
| 2019/0089698 A1 | 3/2019 | Mathew et al. |
| 2019/0207812 A1 | 7/2019 | Li et al. |
| 2019/0213355 A1* | 7/2019 | Raviv .................... H04L 51/04 |
| 2020/0065181 A1 | 2/2020 | Bailey et al. |
| 2022/0164463 A1* | 5/2022 | Zheng ................. G06F 21/6218 |
| 2022/0297635 A1* | 9/2022 | Fang .................... B60R 16/023 |

* cited by examiner

| ROLE-BASED ACCESS CONTROL TABLE 401 | | |
|---|---|---|
| USER | BUSINESS ROLE | PROGRAM |
| TONY | APPLICATION PROGRAMMER | PROGRAM A, PROGRAM B |
| ANDREW | SYSTEM PROGRAMMER | PROGRAM B, PROGRAM C |

| BUSINESS DATA TABLE 402 | | | |
|---|---|---|---|
| TASK A<br>MA1<br>MA2 | LOCATION<br>COMM1<br>CONTAINER 1 | START ADDR<br>0x00000001<br>0x0028FF1C | LENGTH<br>56<br>64 |
| TASK B<br>MA1<br>MA2 | LOCATION<br>COMM2<br>CONTAINER 2 | START ADDR<br>0x00380F1C<br>0x0034041C | LENGTH<br>32<br>64 |

| MEMORY DATA ACCESS CONTROL TABLE 403 | |
|---|---|
| CHANNEL | AUTHORIZATION |
| AGENT=1&CHANNEL=3 | A-B |
| AGENT=3&CHANNEL=1 | A-B-D |
| PasS=Ali | A-B-C-D |
| PasS=Tencent | A-C-D |
| userDefined1=A | A-D |

BUSINESS DATA PROTECTION FOR RUNNING TASKS IN COMPUTER SYSTEM

BACKGROUND

The present invention generally relates to computer systems, and more specifically, to business data protection for running tasks in a computer system.

Computer systems may store relatively large amounts of business data. For example, many types of websites (for example, banks, retailers, and social media) may collect and store potentially sensitive personal user data, including but not limited to names, addresses, credit card numbers, social security numbers, and personal health information on a computer system. If sensitive or otherwise protected (e.g., by data privacy regulations) business data falls into the wrong hands, legal repercussions, fraud, identify theft, or similar harm may occur. A security breach may also result in a loss of consumer trust in an organization.

SUMMARY

Embodiments of the present invention are directed to business data protection for running tasks in a computer system. A non-limiting example computer-implemented method includes receiving a request. The method also includes processing a task corresponding to the request. The method also includes receiving a debugging request from a user corresponding to the task, wherein the debugging request is received during the processing of the task. The method also includes, based on receiving the debugging request, determining whether the user is authorized to access business data corresponding to the task. The method also includes, based on determining that the user is not authorized to access the business data corresponding to the task, redacting the business data from debugging data corresponding to the debugging request. The method also includes providing the redacted debugging data to the user.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 is a block diagram illustrating tables for use in conjunction with business data protection for running tasks in accordance with one or more embodiments of the present invention;

DETAILED DESCRIPTION

Figure 1:
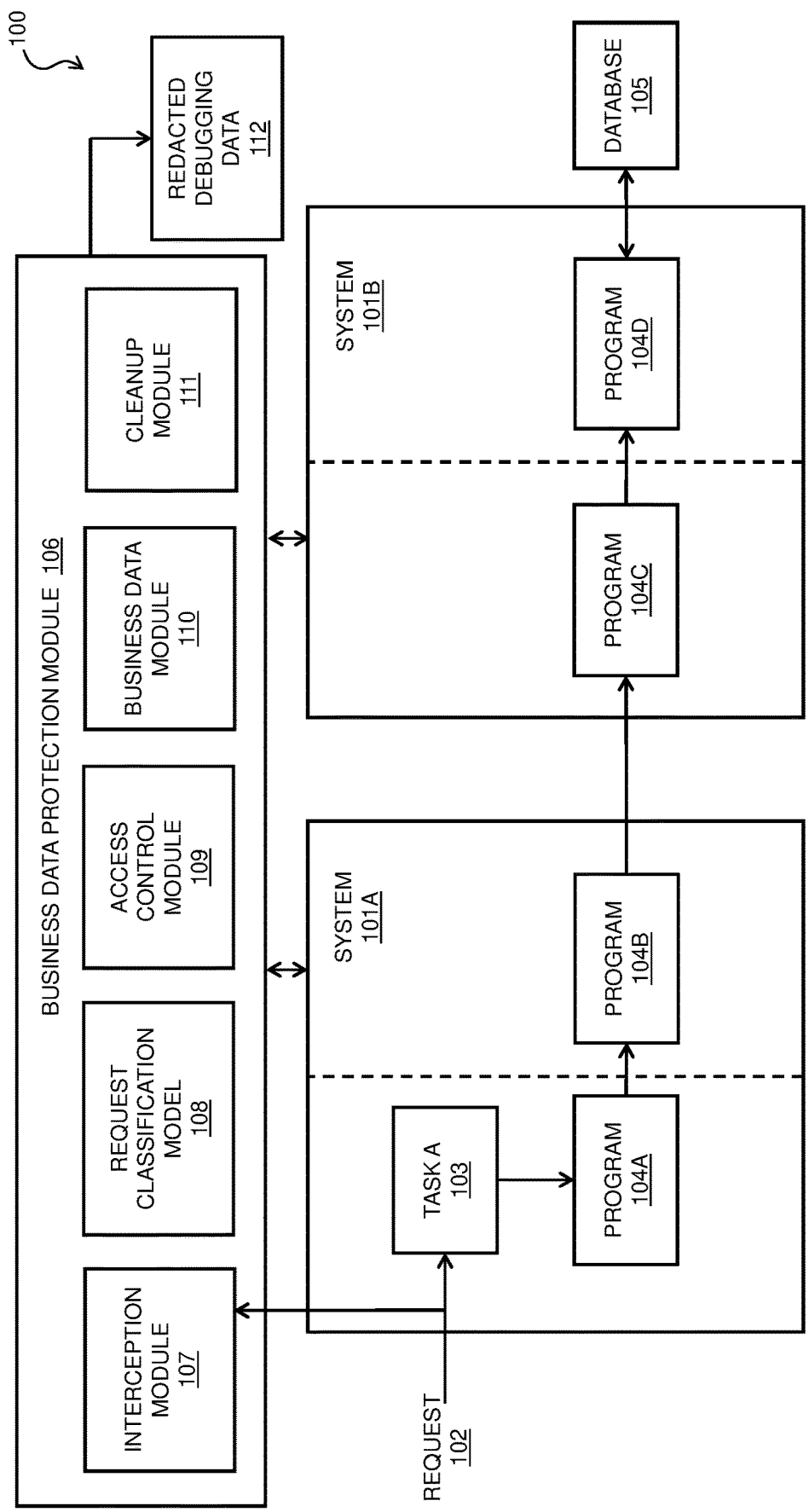
FIG. 1 is a block diagram of components of a system for business data protection for running tasks in accordance with one or more embodiments of the present invention.

One or more embodiments of the present invention provide business data protection for running tasks. Business data can be a valuable asset for a company, and can be collected and used to analyze user behavior, helping a company to better understand their customer base and provide improved service. However, business data can leak via various channels, including via debugging requests to running tasks. Embodiments of business data protection can be implemented to prevent leakage of business data via debugging requests to running tasks, and help build client trust and comply with privacy standards. When an error occurs within a data processing system, analysis of debugging data (e.g., system dump or trace data) by a user (e.g., an administrator or programmer) may be required in order to diagnose and fix the error. The debugging data can contain both system data and business data; however, only the system data may be necessary for analyzing the error. Embodiments of business data protection for running tasks can determine what business data a user that issued a debugging request is authorized to access, and only provide the authorized business data along with the system data in response to the debugging request.

Embodiments of business data protection for running tasks can define where business data exists in the system, and who is authorized to access which data in the data processing system, via a set of tables. A business data table can record the location, starting address, and length of each task-owned data memory block. When a request is received and a task for processing of the request is initialized, the task-owned memory information corresponding to the request is written to the business data table. If a user needs to debug the task while the task is running, the debugging tool can verify whether the user has proper authorization to view the task business data by looking up the user in a role-based access control table to check the authorization of the user to specific program-owned data. If the user does not have authorization to access the task business data, the task business data (e.g., command or application programming interface parameters) will not be displayed to the user (e.g., the business data can be masked to a default value or garbage data in the debugging data). If the user has no authorization to access business data, then the debug utility can allow the user to execute programs but mask the unauthorized business data during the debugging session in order to protect the business data. Further, a system can receive requests from multiple channels (e.g., websites, mobile phones, automatic teller machines, etc.) in hybrid cloud environment. A request classification model can be trained to analyze channel information from incoming requests and generate a memory data access control table that defines the authorization of a sequence of programs for requests from particular channels. The authorized sequence of programs for a request from a particular channel can be compared to the role-based authorization of the user that originates a debugging request in order to determine whether the user has access to business data corresponding to the request from the particular channel.

When a request is received by a processing system, an interception module can intercept the incoming request, and business data field table entries can be generated and updated for any tasks corresponding to the request that are run in the middleware. The request classification model can analyze the incoming request to determine the memory data access control of a program sequence corresponding to the request based on the channel of the request. If, for example, a user takes a memory dump during processing of the request by the task(s), the dump service can verify the user's authorization to access the business data based on the program sequence corresponding to the request and the user's role. If the user has no authorization, then business data can be filtered out or masked in the dump. If the user tries to online debug a running task, the middleware can check the authorization of the user, and mask any business data in the online debugging data.

Turning now to FIG. 1, a system 100 for business data protection for running tasks is generally shown in accordance with one or more embodiments of the present invention. Embodiments of system 100 can include a cloud computing environment as is described below with respect to FIG. 5 and FIG. 6, and can be implemented in conjunction with any appropriate computer device, including but not limited to computer system 700 of FIG. 7. Embodiments of system 100 can correspond to cloud computing nodes 10 of FIG. 5. System 100 includes interconnected computer systems 101A and 101B, and database 105, that host client applications and data for processing requests corresponding to any appropriate number of clients (e.g., business clients). Systems 101A and 101B of system 100 process tasks, such as task 103, corresponding to incoming requests from users (e.g., business customers), such as request 102. Request 102 can be any appropriate type of request, and can be received via any appropriate channel. For example, request 102 can be a banking request for a banking client that can be received from any appropriate communication channel, including but not limited to an automatic teller machine (ATM), a mobile phone, or a desktop computer. The request 102 can include business data regarding the originator of the request, including but not limited to a name, a location, and an account number. As shown in FIG. 1, a request such as request 102 can be processed by a task 103 that calls any appropriate number of programs across systems 101A-B, such as programs 104A-D, and data corresponding to request 102 can be retrieved from database 105 and provided to the requestor associated with request 102. The data retrieved from database 105 in response to request 102 can be passed back to the requestor via any of programs 104A-D, and can include business data. In some embodiments of the invention, each of programs 104A-D can be hosted in separate containers in systems 101A-B. In some embodiments of system 100, each of programs 104A-D can be hosted in a respective container. A system such as system 100 can concurrently process any appropriate number of requests such as request 102 via any appropriate number of respective tasks such as task 103.

Business data protection module 106 is in communication with systems 101A-B, and acts to protect business data during debugging and/or error diagnosis (by, for example, a programmer) in the systems 101A-B. Business data protection module 106 includes an interception module 107, a request classification model 108, an access control module 109, a business data module 110, and a cleanup module 111.

As request 102 is processed via task 103 and programs 104A-D, business data corresponding to the request 102 can be stored in memory areas in systems 101A-B. Business data protection module 106 can determine whether a user (e.g., a computer programmer or administrator) that is requesting debugging (e.g., dump or trace) information regarding task 103 is authorized to access business data belonging to any programs of programs 104A-D that are processing the task 103. If the user is not authorized to access particular business data, the unauthorized business data can be redacted (e.g., removed or masked) in the redacted debugging data 112 that is provided to the user in response to the debugging request. Operation of business data protection module 106 is discussed in further detail below with respect to method 200 of FIG. 2, method 300 of FIG. 3, and system 400 of FIG. 4.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, computer systems, requests, databases, programs, tasks, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
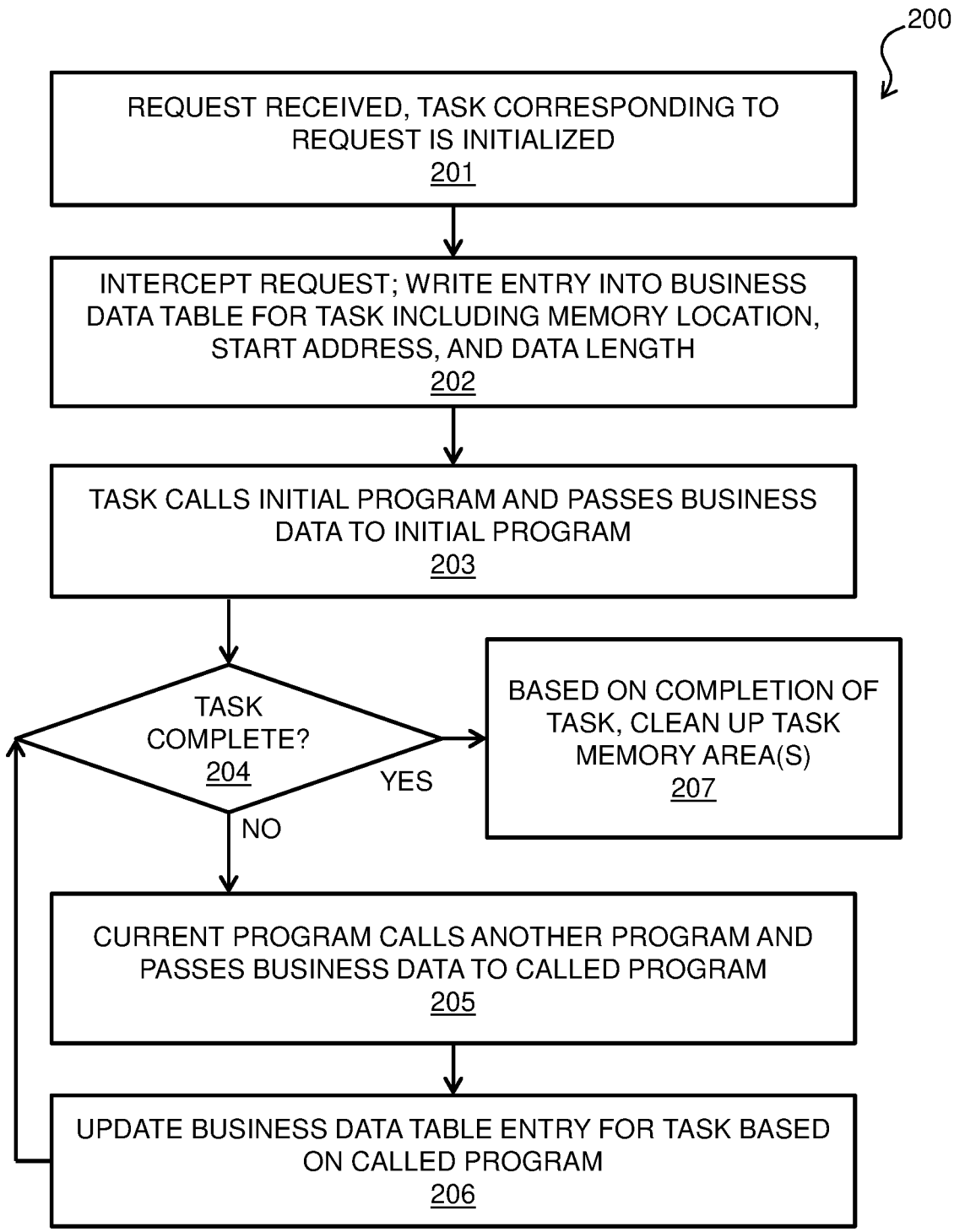
FIG. 2 is a flow diagram of a process for processing a request in conjunction with for business data protection for running tasks in accordance with one or more embodiments of the present invention.

FIG. 2 shows a process flow diagram of a method 200 for processing a request in conjunction with business data protection for running tasks in accordance with one or more embodiments of the present invention. Method 200 of FIG. 2 can be implemented in conjunction with, and is discussed with respect to, embodiments of system 100 of FIG. 1. In block 201 of FIG. 2, a request 102 is received in system 100, and task 103 corresponding to the request is initialized. Initialization of the task 103 can include assigning a memory area in system 101A for the initial processing of task 103 by program 104A. The request 102 can include business data corresponding to a user who sent the request (e.g., a name, an account number, or any other personal information corresponding to the user). In block 202, the request 102 is intercepted by interception module 107 of business data protection module 106, and an entry corresponding to the request 102 is written into a business data table in business data module 110. The entry can include data regarding the memory area that was assigned to the processing of task 103 by program 104A, including but not limited to a location, a start address, and a data length. Embodiments of a business data table, such as is maintained by business data module 110, are discussed in further detail below with respect to business data table 402 of FIG. 4.

In block 203, the task 103 calls an initial program 104A, and passes the business data from request 102 to initial program 104A. Program 104A then processes request 102 according to task 103 using the assigned memory area of program 104A. In block 204, it can be determined whether task 103 is complete. If the task 103 is not complete, the currently processing program 104A calls another program (e.g., program 104B) in block 205, and passes business data corresponding to request 102 to the called program 104B. The called program 104B is assigned a respective local memory area to use for processing of request 102. In block 206, the business data table entry corresponding to task 103 in business data module 110 is updated to include data regarding the memory area that was assigned to the called program 104B in block 205. The business data table entry can include any appropriate information, such as a location, a start address, and a data length. Flow then proceeds from block 206 back to block 204, in which it can be determined whether the task 103 is complete. Blocks 205 and 206 can be repeated for task 103 (e.g., program 104B can call program 104C, and program 104C can call program 104D, in block 205, and updates can be made to the business data table based on the called programs in block 206) until it is determined in block 204 that processing of task 103 is complete. When it is determined that the processing of task 103 is complete in block 204, flow proceeds to block 207. In block 207, cleanup module 111 in business data protection module 106 is triggered, and any memory areas listed in the business data table as corresponding to task 103 are cleaned up in systems 101A-B (e.g., reset to a default value) in order to protect any business data corresponding to completed task 103. The entries corresponding to the task 103 in the business data table can also be invalidated in block 207 based on completion of task 103.

In various embodiments of method 200 of FIG. 2, any appropriate number of programs may be called in order to process a request. Further, multiple tasks may be initialized for the same request in some embodiments (e.g., a first task can be initialized in system 101A, and a second task in system 101B corresponding to the same request). Further, embodiments of method 200 of FIG. 2 can be performed separately for each request that is received in a system such as system 100. In some embodiments of the invention, multiple tasks can be processed concurrently by a system such as systems 100, and the business data table can be updated based on any number of concurrently processing tasks according to method 200 of FIG. 2.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
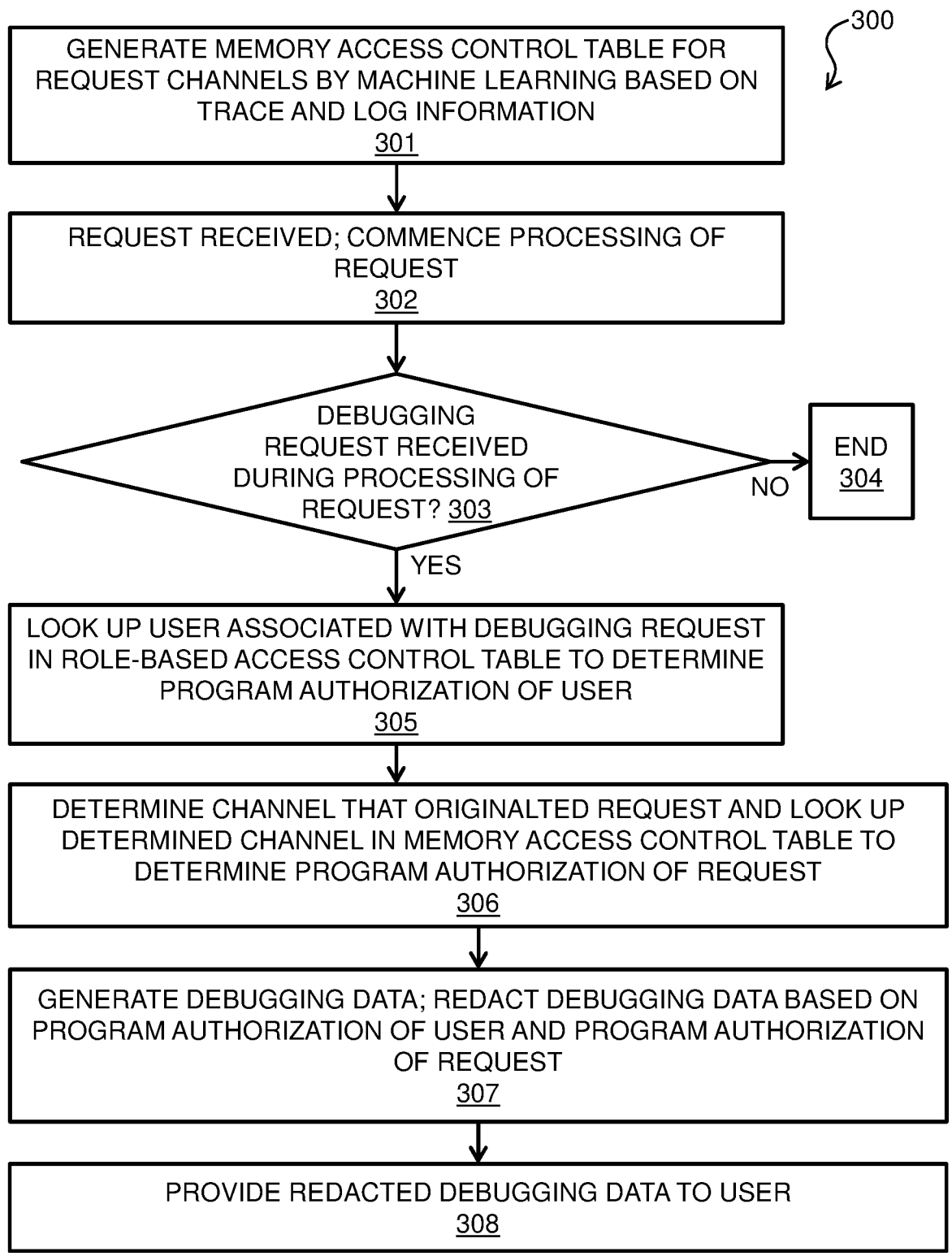
FIG. 3 is a flow diagram of a process for business data protection for running tasks in accordance with one or more embodiments of the present invention.

FIG. 3 shows a process flow diagram of a method 300 for business data protection for running tasks in accordance with one or more embodiments of the present invention. Method 300 of FIG. 3 can be implemented in conjunction with, and is discussed with respect to, embodiments of system 100 of FIG. 1. In block 301 of method 300, a request classification model 108 is trained for use in business data protection module 106. The request classification model 108 includes a machine learning model that can be trained by analyzing existing trace and/or log data from systems 101A-B to determine common program sequence patterns for requests from different channels. Embodiments of request classification model 108 can include a binary-classification model that is trained to classify all channel features as either business data or non-business data using the existing trace and/or log data as training data. Features that can be examined by the request classification model 108 include but are not limited to whether a data field is used in database operations, is used for file access, input/output (I/O), or access serialization (e.g., enqueue/dequeue). The tags output by the request classification model 108 can include business data and non-business data. The request classification model 108 can create a memory data access control table that is maintained in access control module 109 via the machine learning. The memory data access control table can summarize common program calling patterns for particular request channels, and define program-level business data authorization for different request channels. Embodiments of a memory data access control table are discussed in further detail below with respect to memory data access control table 403 of system 400 of FIG. 4.

In block 302, a request 102 is received in system 100, and processing of the request commences as described above with respect to method 200 of FIG. 2. The request 102 can be intercepted by interception module 107 of business data protection module 106 in block 302, as described above with respect to block 202 of method 200. Processing of the request 102 commences in block 302, such that blocks 302-308 of method 300 of FIG. 3 can be performed concurrently with blocks 201-207 of method 200 of FIG. 2 for the same request 102.

In block 303, it is determined whether a debugging request is received in system 100 corresponding to request 102 during the processing of the associated task 103 according to method 200 of FIG. 2. Based on processing of the request 102 completing with no debugging request being received throughout the processing of the task 103 according to method 200 of FIG. 2, flow proceeds from block 303 to block 304, and method 300 ends. If a debugging request is received corresponding to request 102 during the processing of the associated task 103 according to method 200 of FIG. 2, flow proceeds from block 303 to block 305.

In block 305, the user that originated the debugging request that was received in block 304 is looked up in a role-based access control table in access control module 109. Embodiments of role-based access control table are discussed in further detail below with respect to role-based access control table 401 of FIG. 4. The role-based access control table can include a set of entries corresponding to users and/or roles in the system 100, and a list of associated program authorizations for each entry. Users can be assigned roles that are defined in the role-based access control table, such that each role has a different authorization level to access specific business data areas in a computer memory belonging to running tasks or threads. the role-based access control table can define different users' access to data from specific programs according to the user roles. In block 305, any programs for which the user is authorized to access business data are determined.

In block 306, a channel that originated the request 102 is determined by request classification model 108 based on features that are determined from the request 102 by interception module 107, and the determined channel is looked up in a memory data access control table in access control module 109 in order to determine a channel-based program authorization of the request 102. Embodiments of memory data access control table are discussed in further detail below with respect to FIG. 4. The interception module 107 can determine the channel data of a request in any appropriate manner. For example, for a request comprising a hypertext transfer protocol (HTTP) standard package, the interception module 107 can automatically subtract data fields of the request and use the data fields as features. For a user-defined data package, a data structure description file can be provided to interception module 107 to subtract data fields as channel features. In block 306, any programs of programs 104A-D that are used to process the request 102 that own business data can be determined based on the memory data access control table.

In block 307, debugging data corresponding to the debugging request is generated. The generated debugging data can include any appropriate debugging data, such as trace or dump data from systems 101A-B, in various embodiments. The debugging data is then redacted to generate redacted debugging data 112 based on the business data table in business data module 110, and the program authorizations that were determined in blocks 305 and 306. For example, a debugging tool can access data in the system 100 based on the channel entry from the memory data access control table that was determined in block 306, and any data from a memory area that is listed in the business data table can be redacted from the debugging data based on the user not being authorized to access the business data according to blocks 305 in some embodiments of the invention. The redacted debugging data 112 of block 307 can be generated by removing or masking any business data in the debugging data that the user is not authorized to access. In block 308, the redacted debugging data 112 is provided to the requesting user. The requesting user can use the redacted debugging data to diagnose an error in system 100. Embodiments of blocks 302-308 of method 300 of FIG. 3 can be performed separately and/or concurrently for each request and/or task that is processed in a system such as system 100.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Turning now to FIG. 4, a system 400 illustrating tables for use in conjunction with business data protection for running tasks is generally shown in accordance with one or more embodiments of the present invention. System 400 includes embodiments of a role-based access control table 401, a business data table 402, and a memory data access control table 403. A role-based access control table such as role-based access control table 401 can be maintained in access control module 109 of system 100 of FIG. 1, and consulted in block 305 of method 300 of FIG. 3. A business data table such as business data table 402 can be maintained in business data module 110 of system 100 of FIG. 1, and can be maintained according to method 200 of FIG. 2. Memory data access control table 403 can be determined based on request classification model 108 as described above with respect to block 301 of method 300 of FIG. 3, maintained in access control module 109 of system 100 of FIG. 1, and consulted in block 306 of method 300 of FIG. 3.

Role-based access control table 401, as illustrated in FIG. 4, includes a number of entries, each entry corresponding to a user identifier (e.g., "Tony" or "Andrew"). For each user identifier, a business role of the user (e.g., "application programmer" or "system programmer") is listed, and a corresponding program authorization of the user according to their business role. For example, because Tony is an application programmer, Tony is authorized to access data belonging to programs A and B. However, Tony is not authorized to access data belonging to programs C and D. For example, because Andrew is a system programmer, Andrew is authorized to access data belonging to programs B and C. However, Andrew is not authorized to access data belonging to programs A and D. Therefore, if, for example, Tony requests debugging data corresponding to a task, and the debugging data includes business data corresponding to program C, the business data corresponding to program C will be redacted from the debugging data.

Business data table 402, as illustrated in FIG. 4, includes a number of entries, each entry corresponding to a task (such as task 103 of FIG. 1). For each task, memory area data (including location, start address, and length) corresponding to any assigned memory areas is listed. The tasks in business data table 402 can be currently executing tasks in system 100 of FIG. 1. For task A, two memory areas are listed; memory area 1 can correspond to a first program (e.g., program 104A) and memory area 2 can correspond to a second program (e.g., program 104B). For task B, two memory areas are listed; memory area 1 can correspond to a first program (e.g., program 104C) and memory area 2 can correspond to a second program (e.g., program 104D). Memory areas can be listed according to any appropriate identifier, and any appropriate information regarding a memory area can be included in a business data table such as business data table 402.

Memory data access control table 403, as illustrated in FIG. 4, includes a number of entries, each entry corresponding to a request channel, and an associated program authorization for each entry. As illustrated in FIG. 4, memory data access control table 403 includes a list of channels that can send requests, such as request 102 in system 100. For each channel, a set of program authorizations that can process business data corresponding to a request from the particular channel is listed. A memory data access control table 403 can include any appropriate number of channels, listed by any appropriate identifiers, and associated program authorizations in various embodiments of the invention.

It is to be understood that the block diagram of FIG. 4 is not intended to indicate that the system 400 is to include all of the components shown in FIG. 4. Rather, the system 400 can include any appropriate fewer or additional components not illustrated in FIG. 4 (e.g., additional memory components, embedded controllers, functional blocks, connections between functional blocks, modules, inputs, outputs, tables, table entries, data, etc.). Further, the embodiments described herein with respect to system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
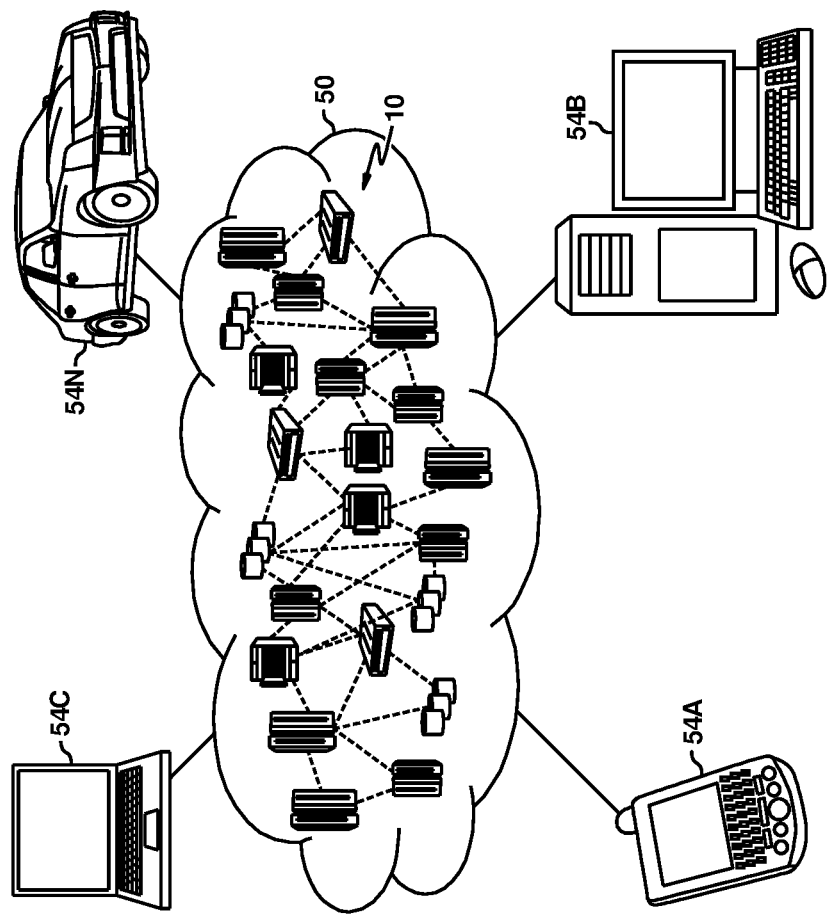
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
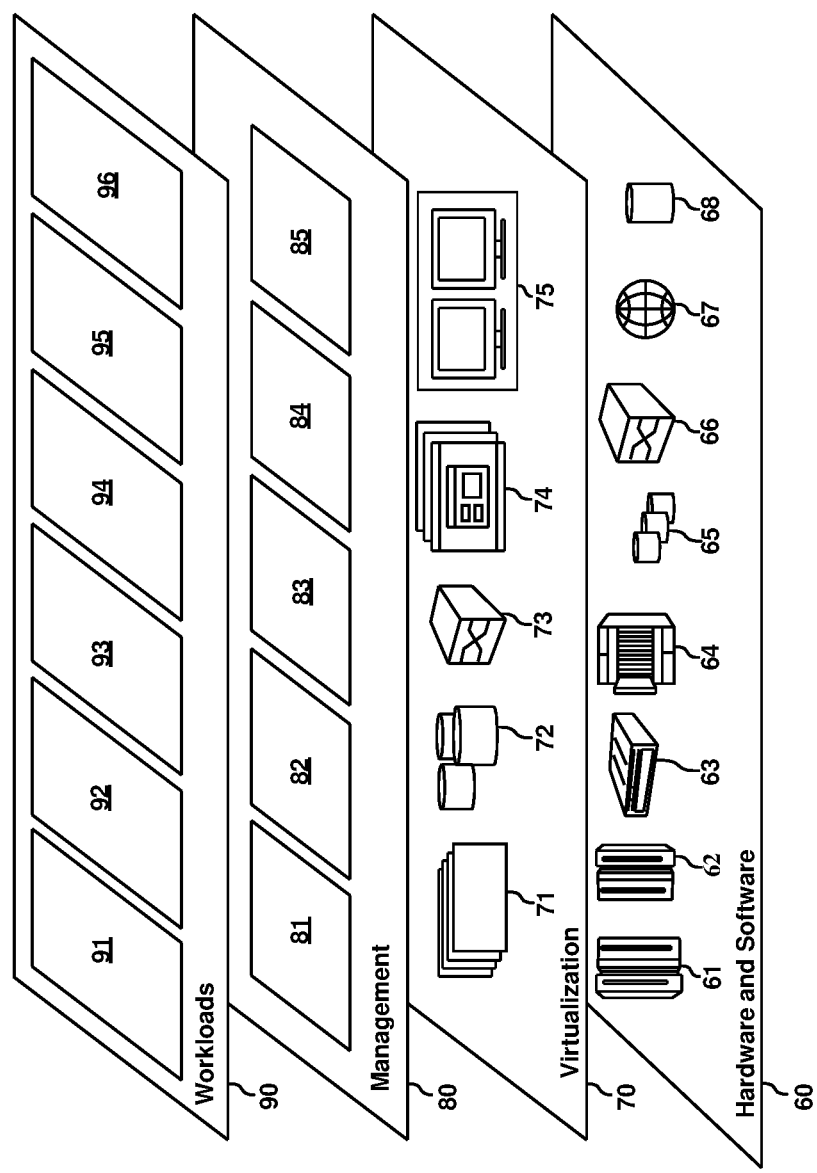
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described herein. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and business data protection 96. Business data protection 96 can implement embodiments of business data protection for running tasks as discussed above with respect to FIGS. 1-4.

Figure 7:
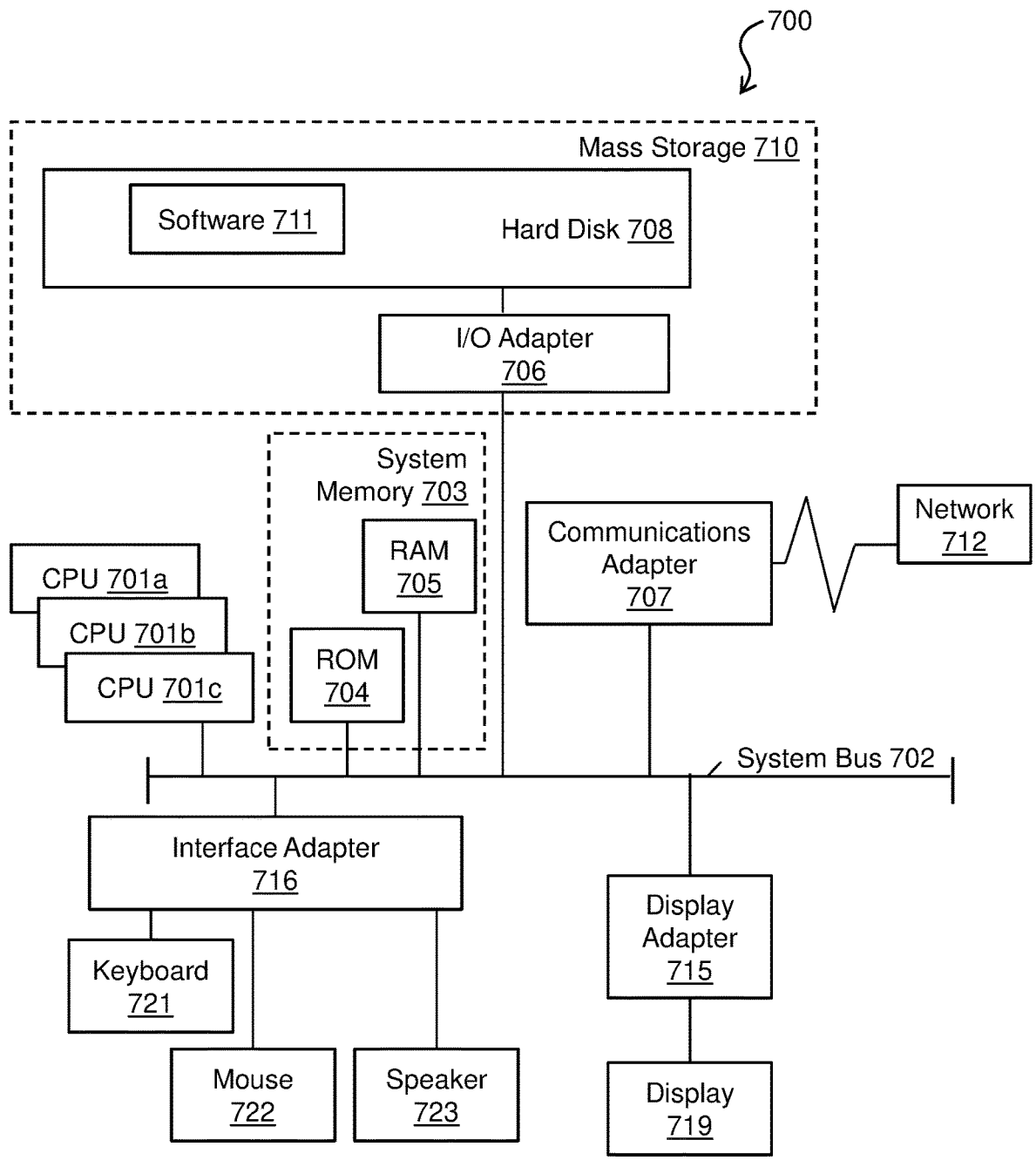
FIG. 7 is a block diagram of an example computer system for use in conjunction with one or more embodiments of business data protection for running tasks.

Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, a request;
processing a task corresponding to the request, wherein processing the task corresponding to the request comprises:
calling a first program by the task;
assigning a first business data memory area to the first program; and
creating an entry in a business data table based on the first business data memory area;
receiving a debugging request from a user corresponding to the task, wherein the debugging request is received during the processing of the task;
based on receiving the debugging request, determining whether the user is authorized to access business data corresponding to the task;
based on determining that the user is not authorized to access the business data corresponding to the task, redacting the business data from debugging data corresponding to the debugging request;
providing the redacted debugging data to the user; and
based on completion of the processing of the task, cleaning up the first business data memory area.

2. The method of claim 1, wherein processing the task corresponding to the request further comprises:
calling a second program by the first program;
assigning a second business data memory area to the second program; and
updating the entry in the business data table based on the second business data memory area.

3. The method of claim 2, further comprising, based on completion of the processing of the task, cleaning up the second business data memory area.

4. The method of claim 1, further comprising:
based on receiving the debugging request, looking up the user in a role-based access control table.

5. The method of claim 4, wherein determining whether the user is authorized to access business data corresponding to the task comprises:
determining whether the user is authorized to access business data corresponding to the first program based on the role-based access control table; and
based on determining that the user is not authorized to access business data corresponding to the first program based on the role-based access control table, redacting data from the first business data memory area from the debugging data.

6. The method of claim 1, further comprising:
intercepting the request;
identifying a channel that originated the request;
determining an authorized program sequence corresponding to the request based on the channel that originated the request; and
redacting business data from the debugging data based on the authorized program sequence.

7. A system comprising:
a memory having computer readable instructions; and
one or more processors for executing the computer readable instructions, the computer readable instructions controlling the one or more processors to perform operations comprising:
receiving a request;
processing a task corresponding to the request, wherein processing the task corresponding to the request comprises:
calling a first program by the task;
assigning a first business data memory area to the first program; and
creating an entry in a business data table based on the first business data memory area;
receiving a debugging request from a user corresponding to the task, wherein the debugging request is received during the processing of the task;
based on receiving the debugging request, determining whether the user is authorized to access business data corresponding to the task;
based on determining that the user is not authorized to access the business data corresponding to the task, redacting the business data from debugging data corresponding to the debugging request; and
providing the redacted debugging data to the user; and
based on completion of the processing of the task, cleaning up the first business data memory area.

8. The system of claim 7, wherein processing the task corresponding to the request further comprises:
calling a second program by the first program;
assigning a second business data memory area to the second program; and
updating the entry in the business data table based on the second business data memory area.

9. The system of claim 8, further comprising, based on completion of the processing of the task, cleaning up the second business data memory area.

10. The system of claim 7, further comprising:
based on receiving the debugging request, looking up the user in a role-based access control table.

11. The system of claim 10, wherein determining whether the user is authorized to access business data corresponding to the task comprises:
determining whether the user is authorized to access business data corresponding to the first program based on the role-based access control table; and
based on determining that the user is not authorized to access business data corresponding to the first program based on the role-based access control table, redacting data from the first business data memory area from the debugging data.

12. The system of claim 7, further comprising:
intercepting the request;
identifying a channel that originated the request;
determining an authorized program sequence corresponding to the request based on the channel that originated the request; and
redacting business data from the debugging data based on the authorized program sequence.

13. A computer program product comprising a computer readable storage medium having program instructions embodied therewith, the program instructions executable by one or more processors to cause the one or more processors to perform operations comprising:
receiving a request;
processing a task corresponding to the request, wherein processing the task corresponding to the request comprises:
calling a first program by the task;
assigning a first business data memory area to the first program; and
creating an entry in a business data table based on the first business data memory area;
receiving a debugging request from a user corresponding to the task, wherein the debugging request is received during the processing of the task;
based on receiving the debugging request, determining whether the user is authorized to access business data corresponding to the task;
based on determining that the user is not authorized to access the business data corresponding to the task, redacting the business data from debugging data corresponding to the debugging request; and
providing the redacted debugging data to the user; and
based on completion of the processing of the task, cleaning up the first business data memory area.

14. The computer program product of claim 13, wherein processing the task corresponding to the request further comprises:
calling a second program by the first program;
assigning a second business data memory area to the second program; and
updating the entry in the business data table based on the second business data memory area.

15. The computer program product of claim 14, wherein the operations further comprise:
based on completion of the processing of the task, cleaning up the second business data memory area.

16. The computer program product of claim 13, wherein the operations further comprise:
based on receiving the debugging request, looking up the user in a role-based access control table.

17. The computer program product of claim 16, wherein determining whether the user is authorized to access business data corresponding to the task comprises:
- determining whether the user is authorized to access business data corresponding to the first program based on the role-based access control table; and
- based on determining that the user is not authorized to access business data corresponding to the first program based on the role-based access control table, redacting data from the first business data memory area from the debugging data.

\* \* \* \* \*